Jan. 7, 1964 W. H. LAKE 3,117,248
LOW PRESSURE MERCURY VAPOR DISCHARGE
LAMP FOR DIRECT CURRENT OPERATION
Filed May 18, 1961 2 Sheets-Sheet 1
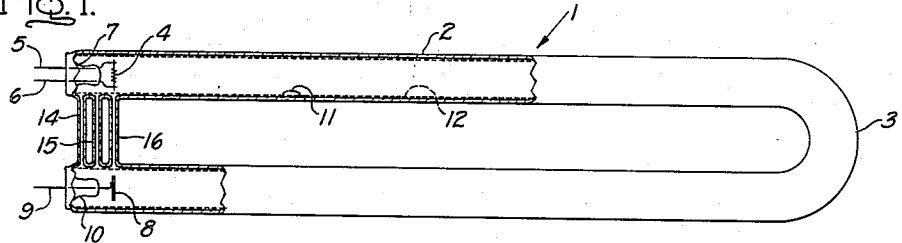
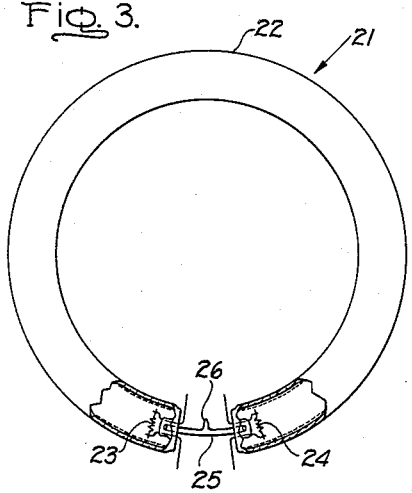
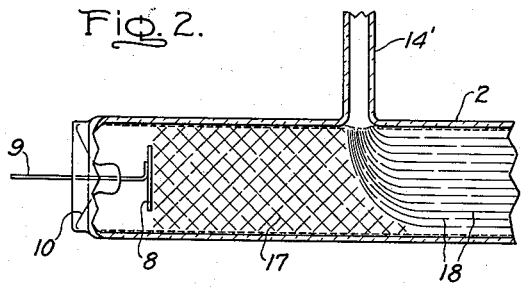
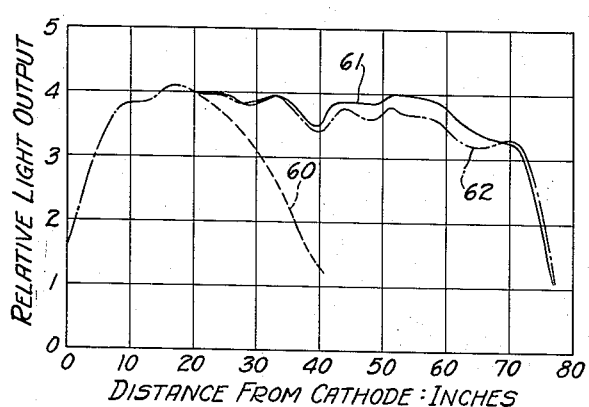
Inventor:
William H. Lake
by Ernest W. Legree
His Attorney Jan. 7, 1964   W. H. LAKE   3,117,248
LOW PRESSURE MERCURY VAPOR DISCHARGE
LAMP FOR DIRECT CURRENT OPERATION
Filed May 18, 1961   2 Sheets-Sheet 2

Inventor:
William H. Lake
by *Ernest W. Legree*
His Attorney

ISO United States Patent Office 3,117,248
Patented Jan. 7, 1964

3,117,248
LOW PRESSURE MERCURY VAPOR DISCHARGE LAMP FOR DIRECT CURRENT OPERATION
William H. Lake, Mayfield Heights, Ohio, assignor to General Electric Company, a corporation of New York
Filed May 18, 1961, Ser. No. 111,029
9 Claims. (Cl. 313—187)

This invention relates to low pressure mercury vapor discharge lamps such as fluorescent lamps especially designed for operation on direct current or on pulsating current having a direct current component.

The operation of tubular fluorescent lamps on direct current presents a peculiar problem resulting from the tendency of the discharge to pump or displace mercury vapor from the anode towards the cathode. This phenomenon, commonly referred to as cataphoresis, causes the mercury to accumulate at the cathode end and to become depleted from the anode end. In the absence of mercury vapor at the anode end, the generation of radiation diminishes and in the extreme case, a large portion of the lamp may become substantially dark.

The phenomenon of cataphoresis on direct current operation is particularly pronounced and objectionable in relatively long tubular fluorescent lamps. With short lamps, especially if they are operated only intermittently, cataphoresis is not so pronounced and such lamps have found use on direct current. There are also some specially designed fluorescent lamps, known as rectifying fluorescent lamps which are specially designed for direct current operation by having a cathode at one end and a pair of anodes at the other, which anodes are energized in half-wave fashion by means of suitable ballast equipment. In the rectifying fluorescent lamp, depletion of mercury from the cathode end is prevented in part by operating the lamp at a relatively high loading so that it runs at a high temperature and this increases the rate of diffusion of mercury back towards the cathode. In addition, the rectifying fluorescent lamp is preferably operated with a slight tilt or slope so as to cause any condensed mercury to run back naturally under the action of gravity towards the cathode end which is arranged lowermost.

Up to the present time, there has been little impetus for operating long fluorescent lamps on direct current primarily because there are few direct current electrical distribution systems. However with the advent of efficient semi-conductive devices including rectifiers, the cost of equipment for converting alternating current to direct current has been drastically reduced. Moreover, such conversion can now be done at high efficiency and by means of equipment which is compact and lightweight. For these reasons, it has now become very desirable to have fluorescent lamps capable of efficient operation on direct current. The term "direct" is used in its broad sense as unidirectional current and including rectified alternating current.

The general object of the invention is to provide new and improved low pressure mercury vapor discharge lamps capable of efficient operation on direct current.

A more specific object of the invention is to provide improved fluorescent lamps adapted to direct current operation and not subject to mercury depletion at the anode end by cataphoretic action.

There are several methods of preventing mercury depletion at the anode of a fluorescent lamp which depend for their effectiveness on increasing the rate of diffusion of mercury vapor back towards the anode in opposition to the cataphoretic action of the discharge which propels the mercury vapor towards the cathode. The rate of diffusion depends in part on the temperature of the envelope walls. Therefore increasing the envelope wall temperature as by providing a heat enclosure or by increasing the current density does to a certain extent counteract the cataphoretic effect. However this method is not always effective and it cannot be applied to all types of lamps. Another method depends upon the use of an envelope cross section which is not entirely filled by the discharge. For instance in a kidney-shaped cross section, the narrow lateral edges or rails do not carry the same intensity of discharge as the central portion so that the mercury vapor can diffuse back more readily along the lateral edges. This method might be stated to involve the provision of low velocity currents or eddies in the discharge stream. It will be recognized that this method is limited to special cross sections and not applicable to circular or substantially circular cross section and hence is limited in its usefulness.

In accordance with the invention, in a low pressure mercury vapor lamp for direct current operation, depletion of mercury from the anode end by cataphoretic action is overcome by providing a mercury feedback passage distinct from or extraneous to the discharge channel through which mercury or mercury vapor can return from the cathode to the anode end. In designing such a passage, there are two governing considerations which must be observed. Firstly, the cross section of the feedback passage must be large enough to supply mercury to the anode end at a rate which effectively compensates for cataphoretic displacement of mercury by the discharge towards the cathode end. Secondly, the feedback passage must present an electrical impedance sufficiently high to prevent the discharge from striking therethrough; in other words, the discharge must be confined to the normal discharge channel and must not be allowed to short-circuit or bypass through the feedback passage. I have determined that the mercury feedback factor and the electrical impedance factor vary with the dimensions of the feedback passage but fortunitously not at the same rate. Therefore by suitably dimensioning the mercury feedback passage as will be more fully explained hereinafter, it is possible under any given set of conditions to provide a passage which will feed back sufficient mercury but which will not short-circuit or bypass the discharge.

The use of an extraneous mercury feedback passage in straight or linear fluorescent lamps is possible, even though economically not too attractive. For instance an auxiliary vitreous tube extending from cathode to anode may be provided either externally to the lamp envelope or within the lamp envelope itself. However fluorescent lamps where the discharge channel is bent or curved or folded back upon itself so that the cathode region comes into physical proximity to the anode region lend themselves admirably to the purpose of the invention. Examples of such lamps are U-shaped fluorescent lamps where a long straight fluorescent lamp is bent back upon itself in hairpin fashion, circline fluorescent lamps where the discharge channel forms a ring, and panel or plaque lamps where a labyrinthine discharge channel is formed between molded glass plates. In the case of panel lamps in particular, mercury feedback passages can readily be formed between various sections of the labyrinthine discharge channel by the simple expedient of molding suitable indentations or cavities in the vitreous component plates which form the desired passages when the plates are assembled and sealed together.

For further objects and advantages and for a better understanding of the invention, attention is now directed to the following explanation of the principles to be observed, and to the description of various embodiments taken in conjunction with the accompanying drawings. The features of the invention believed to be novel will be more particularly pointed out in the appended claims.

In the drawings:

FIG. 1 is a plan view, partly sectioned, of a U-shaped fluorescent lamp provided with a mercury feedback passage according to the invention.

FIG. 2 is a section of the anode end of a fluorescent lamp provided with a mercury feedback passage and illustrating observed characteristics of the discharge resulting from the feedback of mercury vapor through an extraneous passage.

FIG. 3 is a plan view, partly sectioned of a circline fluorescent lamp embodying the invention.

FIG. 6 shows curves comparing the distribution of light output along the arc path in the absence of mercury feedback, with the distribution when a mercury feedback passage is present.

Figures 4, 5:
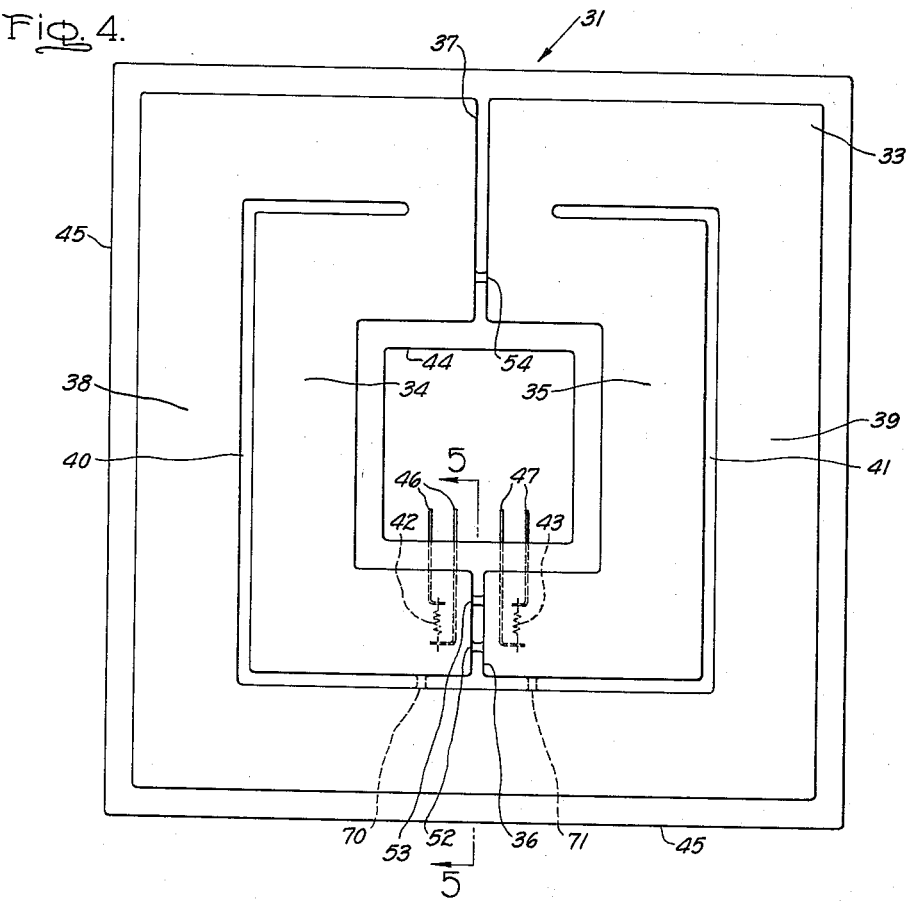
FIG. 4 is a plan view, partly sectioned, of a panel or plaque fluorescent lamp embodying the invention.
FIG. 5 is a sectional view taken along line 5, 5 in FIG. 4.

A form of lamp to which the invention admits of very practical application is a U-shaped fluorescent lamp as illustrated at 1 in FIG. 1. The lamp may correspond in its general physical and electrical characteristics to the common 40-watt fluorescent lamp utilizing a T-12 envelope on a four-foot length. However the vitreous envelope 2 is folded back upon itself at 3 in hairpin fashion with the result that the electrode or base ends are brought back into close physical proximity to each other. The electrode intended for the cathode is conventional and comprises a coiled-coil filament 4 provided with an overwind if desired, and coated with alkaline-earth oxides or other electron-emitting substance. The filament is supported across the inner ends of inleads 5, 6 sealed through the press of the usual mount 7. The electrode intended for operation as anode may if desired be a filamentary structure similar to cathode 4 which has been described. However this is not necessary and a plain metal member 8 such as a disc may be used instead. Anode 8 is supported on the inner end of an inlead 9 sealed through the press of a mount 10. The envelope is provided with an ionizable filling comprising a small quantity of mercury indicated by the droplet 11 which is in excess of the quantity required to provide a mercury vapor pressure in the range of 2 to 10 microns throughout the lamp envelope during normal operation. The lamp filling comprises in addition an inert gas for starting purposes, for instance argon in the pressure range of 2 to 3 millimeters of mercury. A prosphor coating 12 on the inside of the envelope converts the resonance radiation at 2537 A. produced by the electric discharge through the mercury vapor into visible light.

In operation of the lamp on direct current, the cathode 4 is connected to the negative side and the anode 8 to the positive side of a suitable current limited source. Also, at least at starting, preheating current is preferably circulated through filamentary cathode 4 by connecting a suitable low voltage source, for instance 3.5 volts, across inleads 5, 6. In the absence of provision for mercury feedback, it is observed that the anode end of the lamp begins to darken after several hours of operation. With continued operation, the dark region progressively extends further and further away from the anode and may reach around the bend and even up to two-thirds of the arc length distance towards the cathode. As previously mentioned, this phenomenon is due to cataphoresis, that is transport of mercury by the discharge from the anode towards the cathode. In accordance with the invention, this undesirable result may be prevented by providing extraneous mercury feedback passages from the cathode region to the anode region. As illustrated in FIG. 1, these passages may take the form of small bore vitreous tubes 14, 15 and 16 bridged across the electrode end of the vitreous envelope 2. By suitably proportioning the feedback passages as to number, length and internal bore or cross section, adequate feedback of mercury vapor from cathode to anode regions may be achieved without allowing the electric arc to strike through the feedback passages.

The following experiment illustrates conditions encountered and results achieved in accordance with the invention. A T-8 (1" nominal internal diameter) lamp 48" in length was bent into a U-shape as illustrated in FIG. 1, and four extraneous mercury feedback passages consisting of vitreous tubes each 0.02 square inch in cross sectional area and 2 inches long were attached between anode and cathode ends. A side tube (not shown) was provided at the cathode end and cooled in order to collect the mercury thereat and provide a low temperature control spot. The lamp was operated for several hours on direct current at an input loading of 70 watts corresponding to a current of approximately 1.3 amperes while the side tube was cooled below room temperature. Operation was continued until substantially all the mercury had collected in the side tube, as evidenced by darkening of the lamp throughout substantially its entire length. Cooling of the side arm was then discontinued and the mercury control spot allowed to return to room temperature and the temperatures of the mercury feedback passages or tubes was raised to about 70° C. The lamp was then observed to light substantially uniformly from end to end. This indicated that the mercury feedback passages under the stated conditions were capable of feeding enough mercury vapor through from cathode to anode to provide substantially uniform mercury vapor pressure throughout the tube despite the cataphoretic action. The lamp was then operated continuously for 80 hours with the mercury side tube control spot maintained at 24° C., and there was not the slightest suggestion of mercury pump-out. The effective cross sectional area of the feedback passages was then reduced from 0.08 square inch to 0.06 square inch (by sealing off one of the four original feedback tubes and leaving only three as illustrated in FIG. 1) and there was still no suggestion of mercury pump-out.

Interestingly enough, with a particular construction wherein a single mercury feedback tube 14' of equivalent cross sectional area was used and connected into the lamp envelope at a point somewhat forward of the anode as illustrated in FIG. 2, the effect of the mercury feedback could be visibly observed. In the region between the anode 8 and the feedback tube 14', the discharge was substantially dark as indicated by the light cross hatching 17. This of course is due to the absence of mercury vapor in this region. At the aperture of the feedback tube and fanning out therefrom in the direction of the cathode, the mercury appeared to be visibly streaming into the lamp as indicated by the stream lines 18, this effect being due of course to the visible spectral lines caused by the discharge through the mercury vapor.

FIG. 3 illustrates the invention applied to a circular fluorescent lamp 21 of the kind commonly known as a circline lamp wherein the vitreous envelope 22 is curved back upon itself to form a ring or toroid. The lamp is shown with filamentary type electrodes 23, 24 sealed into opposite ends with the usual inlead and mount structure. Each mount is provided with an exhaust tube and these are joined together in the region between the overlapping ends by means of a section 25 which is also provided with a side branch 26. The side branch 26 is used to exhaust and gas fill the lamp and to introduce the mercury thereinto. Thereafter the side branch is tipped off as indicated and has no further function. Both electrodes 23, 24 are of the filamentary activated type; either may be used as cathode and preheated at starting in order to reduce the starting voltage required and to prevent sputtering; the other electrode used as anode is not preheated. During operation under direct current or on pulsating unidirectional current, tubing 25 provides a mercury feedback passage which counteracts the cataphoretic effect by feeding back mercury vapor from the cathode region to the anode region. The lamp may be provided with the usual four-pin type of base commonly used with circline fluorescent lamps and comprising a pair of plastic shell halves overlapping the juxtaposed ends of the lamp but modified to accommodate and hide from view the mercury feedback tube 25.

The invention is of maximum interest in connection with fluorescent panel lamps wherein it offers the greatest practical advantages. In these lamps, the discharge path is a labyrinthine channel formed between a pair of viterous components sealed together. The discharge channel may readily be arranged such that the cathode and anode are located in close physical proximity to each other and separated only by a relatively thin glass wall or partition. The mercury feedback passage may conveniently be molded or formed in this partition prior to sealing the vitreous components together. Thus the mercury feedback passage is an integral part of the lamp which can be provided at substantially no extra manufacturing cost and without entailing any relatively fragile vitreous tubes external to the lamp envelope or body.

A fluorescent panel lamp provided with integral mercury feedback passages and constituting a preferred embodiment of the invention is illustrated at 31 in FIG. 4. It is in the form of a generally flat square panel with a square opening in the center in which a ballast may be mounted to provide an integral lamp ballast structure. The envelope is made up of a pair of complementary molded glass components 32, 33. The lower component 32 forms the faceplate of the clamp which is ordinarily exposed to view and it may be provided with a pattern of shallow embossments for the sake of appearance and in order to improve its strength. The upper component 33, which may be referred to as the backplate, is molded or blown to define, in cooperation with the faceplate, a labyrinthine discharge channel or passage by means of four groove sections. The two inside sections 34, 35 extend from end partition 36 to intermediate partition 37. The outside sections 38, 39 extend from the intermediate partition 37 and merge together on the opposite side. The inside and outside sections are separated by the longitudinally extending partitions 40, 41 whereby there is provided a continuous channel or discharge path extending from one electrode 42 to the other electrode 43.

The edges of the faceplate and backplate are hermetically sealed together at least at the inner periphery 44 bounding the central square aperture and at the outer periphery 45. This may be done either directly by fusion of the glass or through the use of a lower melting point soldering glass. Along the junctures of the ridges in the faceplate and backplate where the glass components abut together to make the partitions 36, 37, 40 and 41 bounding the labyrinthine discharge channel, the vitreous components may be sealed together if desired but it is not essential that this be done. Provided the vitreous components fit closely together along the junctures, the discharge will not leak through at the partitions but will follow the labyrinthine path from end to end. When the lamp envelope is evacuated, atmospheric pressure serves to press the vitreous components together so that the assembly is rigidified despite lack of sealing along the intermediate junctures. Atmospheric pressure, by pressing the components together, also serves to prevent the discharge from leaking or short-circuiting through the junctures.

Both discharge supporting electrodes 42, 43 have been illustrated as of the filamentary activated type coated with alkaline earth electron-emitting oxides. The filaments are fastened to the inner ends of inleads 46, 47 which are sealed through the inner rim or edge 44 of the vitreous plates. As previously mentioned, where the lamp is to be operated exclusively on direct current, only the cathode need be of the filamentary activated type and a simple metal disc or plate may be used for the anode. However by making both electrodes of the filamentary activated type, the manufacturing process is simplified somewhat and furthermore it makes possible the use of alternating current during the activation schedule.

The lamp contains an ionizable atmosphere including a starting gas or mixture of one or more of the inert rare gases of group 0 of the periodic table at a low pressure, for instance argon at a pressure of 0.5 to 5, preferably 2 to 3, millimeters of mercury, along with mercury vapor. The quantity of mercury added, indicated by the droplet 48, exceeds that vaporized during normal operation of the lamp wherein it exerts a partial pressure in the range of 2 to 10 microns, more commonly 5 to 8 microns, for optimum generation of 2537 A. This radiation energizes the phosphor coating indicated at 49 on the backplate and at 50 on the faceplate, the phosphor in turn producing visible light. The phosphor may be applied more sparingly on the faceplate, or alternatively a reflecting coating may be applied to the backplate, to cause the lamp to emit a greater proportion of its light downwardly through the faceplate than through the backplate. Preferably the lamp is constructed using marginal ledge seals at 44 and 45 formed under high pressure at relatively low temperature following the teachings of copending application Serial No. 106,829, filed May 1, 1961, of Richard S. Christy, entitled "Panel Lamp and Manufacture Thereof," and assigned to the same assignee as the present invention.

In accordance with the invention, in order to prevent depletion of mercury from the anode region as a result of cataphoretic action under direct current operation, a mercury feedback passage is provided in partition 36 between anode and cathode regions. In the illustrated embodiment, two feedback passages 52, 53 in the form of thin slots have been provided in partition 36, and an additional feedback passage 54, likewise in the form of a thin slot, in intermediate partition 37. A convenient way to form the slot is to provide a furrow or depression at the appropriate places in either the faceplate or the backplate prior to sealing the two together. The furrows or depressions may be formed in any convenient manner, for instance during the molding operation or by grinding after molding. Then when the two components are sealed together under heat and pressure, care is taken not to apply pressure in the regions of the furrows with the result that the desired mercury feedback passages are obtained.

The mercury feedback passages must be proportioned in their dimensions to feed through sufficient mercury vapor to maintain substantially constant light output from end to end of the discharge channel and at the same time must not allow a short circuiting electric arc to strike through. I have conducted tests on many different sizes of feedback passages in various types of lamps from which I have concluded that both requirements may be met in any given lamp configuration by suitable choice of dimensions in the feedthrough aperture. The reason for this is that the feedthrough of mercury increases with the total cross-sectional area of the aperture, while the potential difference which a given aperture can withstand without arcing through depends primarily on the minimum transverse dimension of the aperture. Thus one may compare apertures of the same axial length but wherein one is a circular hole of a given diameter, and the other is a slot of the same thickness as the diameter of the hole but of substantially greater width. Both apertures will withstand approximately the same potential difference before arcing through, but the slot will feed through a much greater quantity of mercury than the circular hole. In fact, it appears that a slot of a given thickness can be increased more or less indefinitely in width without any appreciable decrease in the arc-through voltage which it can stand off while the quantity of mercury which it can feed through increases approximately in proportion to the width.

When the actual feedthrough of mercury vapor experimentally determined is compared with that calculated for molecular flow of mercury vapor through an opening, reasonably satisfactory correlation is established. Based on molecular flow theory, the feed of mercury through an aperture between regions of different mercury vapor pressure is given approximately by the following formula:

$$Q_{Hg} = K \cdot D \cdot \Delta P \qquad \text{I}$$

wherein $Q_{Hg}$ = Volume of mercury vapor fed through in cm.³/sec.,
$K$ = proportionality constant ($3.0 \times 10^4$ cm./sec. for Hg at 40° C.),
$D$ = dimensional factor, and $\Delta P$ = pressure differential in microns of mercury between the two regions.

The dimensional factor D is given approximately by the following relationship:

$$D = \frac{A^2}{H \cdot L} \qquad \text{II}$$

wherein $A$ = cross-sectional area of feedback aperture in cm.²,
$H$ = perimeter of feedback aperture in cm., and $L$ = axial length of feedback aperture in cm.

In the case of a thin slot of substantially greater width than thickness, the dimensional factor is given approximately by the following relationship:

$$D = \frac{W \cdot T^2}{2L} \qquad \text{III}$$

wherein $W$ = width of slot in cm.,
$T$ = thickness of slot in cm., and $L$ = axial length of slot in cm.

The pressure differential $\Delta P$ available depends primarily upon the difference in brightness which may be tolerated from end to end of the lamp. In a low pressure mercury vapor discharge lamp dependant upon generation of 2537 A. resonance radiation for excitation of a phosphor, mercury vapor pressure should be within the range of 2 to 10 microns. In order that the light output from end to end of the discharge channel vary not more than 10%, a minimum mercury vapor pressure of 2 microns is required at the anode end. Therefore if one assumes a maximum mercury vapor pressure of 10 microns at the cathode end, the maximum tolerable pressure differential $\Delta P$ is 8 microns. In order to compensate for manufacturing variations and for variations in ambient temperature, an allowable pressure differential $\Delta P$ of 4 microns may be assumed.

The voltage which an aperture of given dimensions can stand off may be determined approximately on the basis of the following empirical relationship:

$$V = 490 \cdot L - 550 - 190 \cdot \log_e T \qquad \text{IV}$$

wherein $V$ = breakdown voltage (R.M.S.-A.C.)
$L$ = axial length of feedback aperture in cm., and $\log_e T$ = natural logarithm of the thickness (least transverse dimension) in cm.

In using the foregoing relationships to determine the mercury feedback aperture dimensions for a fluorescent panel lamp having a discharge channel length of approximately 75″, in order to provide a reasonable safety factor an A.C.-R.M.S. stand-off voltage of 300 volts may be assumed. A panel lamp of the stated discharge channel length may be either a 14″ square panel with a rectangular aperture in the center, or a 14″ diameter round panel with a circular aperture in the center. Assuming that the width of the vitreous juncture at partition 36 (FIG. 4) is 0.45 cm., this determines the axial length L of the slot; by applying Equation IV, the maximum permissible thickness T of the slot is determined to be .034 cm. On the basis of the assumptions previously discused, a dimenional factor D of approximately 2 is needed in order to maintain a light distribution varying not more than 10% for a minimum ambient temperature of 55° F. By applying Equation III, the width dimension W of the slot is determined to be 0.65 cm. in order to provide the required feedthrough of mercury vapor. For practical reasons having to do with glass molding or forming, several slots of lesser width are preferred to a single relatively wide slot. For the subject lamp illustrated in FIG. 4, the preferred arrangement is to provide two slots 52, 53 in the end partition 36 between cathode and anode having a thickness of .025 cm. and a width of 1.25 cm. (0.010″ x ½″). As an alternative choice, four slots 0.025 cm. in thickness x 0.65 centimeters in width (0.010″ x ¼″) may be used. The thickness of the slots has been greatly exaggerated in FIG. 5 in order to permit of illustration.

The relative light output along the discharge channel of a fluorescent panel lamp having a channel length of 75″ and provided with mercury feedback apertures in the form of slots as described is shown in FIG. 6. Dotted line curve 60 shows the light output on D.C. operation in the absence of mercury feedback apertures; it will be observed that the relative light output falls below 50% of maximum at a distance of approximately 35″ from the cathode. In fact less than 25% of the length of the discharge channel is operating at normal brightness. Solid line curve 61 shows the result when the feedback aperture slots are provided. The light output now remains substantially constant throughout the entire channel length from cathode to anode. The minor variations or ups and downs in light output which appear in the curve are due to inter-reflections of light from the various grooves and curved surfaces of the panel lamp. For purposes of comparison, dot-dash line curve 62 has been plotted which shows the variation in light output with conventional alternating current operation. It will be observed that the uniformity of light output with D.C. operation where mercury feedback apertures are provided is substantially equivalent to that obtaining with alternating current operation.

Depletion of mercury as the result of cataphoretic action first makes itself felt in the anode region and accumulation takes place in the cathode region. Accordingly the preferred placement of mercury feedback passages is in the wall or partition between anode and cathode regions. However beneficial results may also be obtained by placing mercury feedback passages at intermediate points, for instance at 54 in intermediate partition 37 in FIG. 4. A feedback passage at such a point is preferably merely a supplement to feedback passages between the anode and cathode regions. However feedback passages at intermediate points are also useful to promote rapid equalization of mercury pressure throughout the lamp, especially under conditions of low ambient temperature operation. In this connection, the invention is also useful on lamps intended for A.C. operation wherein, at low operating temperature, the mercury may tend to accumulate near the longitudinal center of the discharge channel and to become depleted from the regions of both electrodes. For this condition, the optimum location of the mercury feedback passages will naturally be such as to provide feedback of mercury from the central region of the discharge channel to the electrode region. In the lamp illustrated in FIG. 4, the preferred location of the mercury feedback passages under these circumstances would be as indicated in dotted lines at 70 and 71 in the longitudinally extending partition between the electrode regions and the outer channel section.

While specific embodiments of the invention have been illustrated and described in detail, they are intended as illustrative and not in order to limit the invention thereto. Modifications will readily occur to those skilled in the art and it is intended by the appended claims to cover any such as fall within the true spirit and scope of the invention.

What I claim as new and desire to secure by Letters Patent of the United States is:

1. A low pressure mercury vapor discharge lamp comprising a vitreous envelope providing an elongated discharge channel with electrodes sealed into opposite ends and an ionizable medium therein including mercury for providing in operation a mercury vapor pressure in the range of 2 to 10 microns for supporting an electric discharge with efficient generation of 2537 A. radiation, and a mercury feedback passage extending from a region of depletion of mercury to a region of accumulation of mercury within said lamp, said passage being dimensioned to transmit mercury vapor while preventing bypass of the electric discharge therethrough.

2. A low pressure mercury vapor discharge lamp comprising a vitreous envelope providing an elongated discharge channel and having discharge-supporting electrodes sealed into opposite ends, an ionizable medium including mercury sealed therein for providing in operation a mercury vapor pressure in the range of 2 to 10 microns for supporting an electric discharge with efficient generation of 2537 A. radiation, and a feedback passage between the electrode regions of said envelope permitting transmission of mercury vapor while preventing bypass of the electric discharge therethrough, in order substantially to equalize the mercury vapor pressure within said envelope.

3. A low pressure mercury vapor discharge lamp comprising a vitreous envelope defining an elongated discharge channel, electrodes sealed into opposite ends of said channel and an ionizable medium therein including mercury vapor, said envelope having a configuration such that the electrode regions are physically spaced in close proximity to each other, and a mercury feedback passage bridging across said electrode regions and permitting transmission of mercury vapor between said regions while preventing bypass of the electric discharge therethrough.

4. A low pressure mercury vapor discharge lamp comprising a vitreous envelope defining an elongated discharge channel, electrodes sealed into opposite ends of said channel and an ionizable medium therein including mercury vapor, said envelope having a configuration such that the electrode regions are physically spaced in close proximity to each other, and a mercury feedback passage bridging across said electrode regions, said passage being dimensioned such that sufficient mercury is transmitted therethrough under the pressure differential resulting from cataphoretic action in said lamp to prevent depletion of mercury from the anode region, said passage further having a minimum transverse dimension sufficiently small in respect of the axial length of said passage and the voltage difference encountered between electrode regions to prevent bypass of the electric discharge therethrough.

5. A low pressure mercury vapor discharge lamp comprising a vitreous envelope defining an elongated discharge channel, electrodes sealed into opposite ends of said channel and an ionizable medium therein including mercury vapor, said envelope having a configuration such that the electrode regions are physically spaced in close proximity to each other, and mercury feedback passages bridging across said electrode regions, said passages having a total transverse cross-sectional area in respect of their axial length large enough that sufficient mercury is transmitted therethrough to substantially equalize mercury vapor pressure throughout said lamp despite cataphoretic action, said passages further having a minimum transverse dimension sufficiently small in respect of their axial length and the voltage difference encountered between electrode regions to prevent bypass of the electric discharge therethrough.

6. A fluorescent panel lamp comprising a vitreous envelope formed by a backplate and a faceplate sealed together along their margins, said plates being formed with a labyrinthine groove extending throughout their area to provide a discharge channel, electrodes sealed into said lamp at the ends of said channel, an ionizable medium within said lamp including mercury vapor, the various portions of said channel being separated from each other by vitreous partitions, and a mercury feedback passage through one of said partitions extending from a region of depletion of mercury to a region of accumulation of mercury, said passage being dimensioned to transmit mercury vapor while preventing bypass of the electric discharge therethrough.

7. A fluorescent panel lamp comprising a vitreous envelope formed by a backplate and a faceplate sealed together along their margins, said plates being formed with a labyrinthine groove extending throughout their area to provide a discharge channel and the ends of said groove being located in close physical proximity and separated by a vitreous partition, electrodes sealed into said lamp at the ends of said channel, an ionizable medium within said lamp including mercury vapor, said partition being provided with small apertures therethrough inter-connecting the ends of said channel and serving as mercury feedback passages.

8. A fluorescent panel lamp comprising a vitreous envelope formed by a backplate and a faceplate sealed together along their margins, said plates being formed with a labyrinthine groove extending throughout their area to provide a discharge channel and the ends of said groove being located in close physical proximity and separated by a vitreous partition, electrodes sealed into said lamp at the ends of said channel, an ionizable medium within said lamp including mercury vapor, said partition being provided with relatively thin slots therethrough inter-connecting the ends of said channel and serving as a mercury feedback passage.

9. A fluorescent panel lamp comprising a vitreous envelope formed by a backplate and a faceplate sealed together along their margins, said plates being formed with a labyrinthine groove extending throughout their area to provide a discharge channel and the ends of said groove being located in close physical proximity and separated by a vitreous partition, electrode sealed into said lamp at the ends of said groove, an ionizable medium within said lamp including mercury vapor, said partition being provided with relatively thin slots therethrough inter-connecting the ends of said channel and serving as mercury feedback passages, the total cross sectional area of said slots in respect of their length being large enough that sufficient mercury is transmitted therethrough to substantially equalize mercury vapor pressure throughout said channel despite cataphoretic action, said slots further having a minimum transverse dimension sufficiently small in respect of their length to stand off the voltage difference between the ends of said channel.

References Cited in the file of this patent

UNITED STATES PATENTS

| | | |
|---|---|---|
| 1,005,866 | Moore | Oct. 17, 1911 |
| 2,105,463 | Cordes | Jan. 18, 1938 |